United States Patent
Ishikawa

(10) Patent No.: US 11,549,413 B1
(45) Date of Patent: Jan. 10, 2023

(54) INTERNAL COMBUSTION ENGINE

(71) Applicant: TOYOTA JIDOSHA KABUSHIKI KAISHA, Aichi-ken (JP)

(72) Inventor: Masami Ishikawa, Aichi-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/832,699

(22) Filed: Jun. 6, 2022

(30) Foreign Application Priority Data

Aug. 6, 2021 (JP) .............................. JP2021-130120

(51) Int. Cl.
*F01M 13/04* (2006.01)
*F02M 25/06* (2016.01)
*B01D 45/00* (2006.01)
*F01M 11/02* (2006.01)
*F01M 13/00* (2006.01)

(52) U.S. Cl.
CPC ............. *F01M 13/04* (2013.01); *B01D 45/00* (2013.01); *F01M 11/02* (2013.01); *F02M 25/06* (2013.01); *F01M 2013/0038* (2013.01); *F01M 2250/60* (2013.01)

(58) Field of Classification Search
CPC .................. F01M 13/04; F01M 11/02; F01M 2013/0038; F01M 2250/60; B01D 45/00; F02M 25/06; F02M 35/10006
See application file for complete search history.

(56) References Cited

U.S. PATENT DOCUMENTS

2019/0234262 A1* 8/2019 Ishikawa ................. F02B 75/22
2020/0123944 A1* 4/2020 Ishikawa ............ F02M 35/1038

FOREIGN PATENT DOCUMENTS

| JP | 2017-194030 A | 10/2017 |
| JP | 2019-132233 A | 8/2019 |
| JP | 2020-67008 A | 4/2020 |
| JP | 2020-183737 A | 11/2020 |

* cited by examiner

*Primary Examiner* — Syed O Hasan
(74) *Attorney, Agent, or Firm* — Hauptman Ham, LLP

(57) ABSTRACT

An internal combustion engine includes a blow-by gas processing device. A cylinder head cover of the internal combustion engine is provided with a joint portion including a connection port to which a connection pipe is connected and a throttle portion having a passage sectional area smaller than a passage sectional area of the connection port. The joint portion is communicated with an inside of a cylinder head and a space in the joint portion serves as an oil separator. A pressure sensor is connected to the space in the oil separator via a connection passage. The connection passage includes a first pipe, a second pipe, and a chamber including a first connection port to which the first pipe is connected and a second connection port to which the second pipe is connected. The first connection port and the second connection port are open toward the same direction in the chamber.

6 Claims, 3 Drawing Sheets

INTERNAL COMBUSTION ENGINE

CROSS-REFERENCE TO RELATED APPLICATION

This application claims priority to Japanese Patent Application No. 2021-130120 filed on Aug. 6, 2021, incorporated herein by reference in its entirety.

BACKGROUND

1. Technical Field

The present disclosure relates to an internal combustion engine including a blow-by gas processing device.

2. Description of Related Art

Japanese Unexamined Patent Application Publication No. 2019-132233 (JP 2019-132233 A) discloses an internal combustion engine including a blow-by gas processing device that processes blow-by gas that has leaked from a combustion chamber to a crankcase, by causing the blow-by gas to return from a cylinder head cover to an intake passage.

The cylinder head cover of the internal combustion engine is provided with a pipe joint for connecting a connection pipe connected to the intake passage. A throttle portion is provided inside the pipe joint. Accordingly, the connection pipe communicates with the inside of the cylinder head cover via the throttle portion. The other end of the connection pipe is connected to the intake passage. Thus, the inside of the cylinder head cover and the intake passage are communicated with each other by the connection pipe. Further, a union portion for connecting a pressure sensor is provided between the portion of the pipe joint to which the connection pipe is connected and the throttle portion.

When the connection pipe is disconnected from the pipe joint or from the intake passage, the pressure value detected by the pressure sensor changes suddenly. Therefore, by monitoring the pressure value detected by the pressure sensor, it is possible to detect that the connection pipe has been disconnected. Also, when the connection pipe is damaged, the pressure value detected by the pressure sensor changes suddenly. Therefore, by monitoring the pressure value detected by the pressure sensor, it is also possible to detect damage to the connection pipe.

SUMMARY

Intake pulsation occurs during the operation of the internal combustion engine. Thus, when the intake pulsation propagates through the connection pipe, the pressure value detected by the pressure sensor also fluctuates due to the influence of the intake pulsation. This hinders proper detection of the abnormality of the connection pipe.

Hereinafter, means for solving the above issue and its operations and effects will be described.

An internal combustion engine for solving the above issue is an internal combustion engine including a blow-by gas processing device that processes blow-by gas that has leaked from a combustion chamber to a crankcase, by causing the blow-by gas to return to an intake passage. In this internal combustion engine, a cylinder head cover is provided with a joint portion including a connection port to which a connection pipe connected with the intake passage is connected and a throttle portion having a passage sectional area smaller than a passage sectional area of the connection port.

In this internal combustion engine, the joint portion is communicated with an inside of a cylinder head via the throttle portion, and a space between the throttle portion and the connection port of the joint portion serves as an oil separator that separates oil contained in the blow-by gas. This internal combustion engine includes a pressure sensor that is connected to the space in the oil separator at the joint portion via a connection passage and that detects pressure in the oil separator. The connection passage includes a first pipe connected to the joint portion, a second pipe connected to the pressure sensor, and a chamber including a first connection port to which the first pipe is connected and a second connection port to which the second pipe is connected. In this internal combustion engine, the first connection port and the second connection port are open toward the same direction in the chamber.

According to the above configuration, the pressure sensor is connected to the joint portion via the first pipe, the chamber, and the second pipe. Therefore, even when the intake pulsation propagates to the joint portion, the intake pulsation is mitigated when passing through the chamber. Further, the first connection port and the second connection port are open toward the same direction in the chamber. Thus, the intake pulsation that has propagated into the chamber through the first pipe is less likely to propagate to the second connection port. Therefore, it is possible to suppress fluctuations in the pressure value detected by the pressure sensor from occurring due to the influence of the intake pulsation. As a result, by monitoring the pressure value detected by the pressure sensor, it is possible to appropriately detect an abnormality in the connection pipe.

In one aspect of the internal combustion engine, the chamber forms a space surrounded by a ceiling, a floor, and a side wall. Each of the first connection port and the second connection port is provided on the side wall. The first connection port and the second connection port are open toward the side wall facing the side wall provided with the first connection port and the second connection port in the chamber.

The pressure wave that has propagated into the chamber through the first connection port tends to be attenuated when colliding with the side wall of the chamber. According to the above configuration, by causing the pressure wave that has propagated through the first connection port to collide with the side wall to attenuate the pressure wave, the influence of the intake pulsation on the pressure value detected by the pressure sensor can be mitigated.

In one aspect of the internal combustion engine, the first connection port and the second connection port are open toward a common side wall in the chamber. A distance between the first connection port and the common side wall is shorter than a distance between the second connection port and the common side wall.

The shorter the distance between the side wall and the first connection port, the more likely the pressure wave is attenuated by colliding with the side wall. However, if the second connection port is also located near the side wall, the pressure wave that has collided with the side wall and bounced off is likely to enter the second connection port.

In this view, as in the above configuration, when the first connection port is near the side wall facing the first connection port, but the second connection port is distanced from the side wall, the influence of the pressure wave bouncing off from the side wall can be suppressed. Therefore, the pressure wave that has propagated from the first connection port into the chamber can be caused to collide with the side wall to effectively mitigate the influence of the intake pulsation.

In one aspect of the internal combustion engine, the second connection port is located vertically above the first connection port in a posture in which the internal combustion engine is mounted.

The blow-by gas contains oil mist and water. If oil or water derived from such oil mist or water adheres to the pressure sensor, the detection sensitivity of the pressure sensor will decrease.

According to the above configuration, since the second connection port is located vertically above the first connection port, even if oil or water enters the chamber through the first connection port along the flow of the blow-by gas, the oil or water is unlikely to reach the second connection port. It is thus possible to suppress oil and water from adhering to the pressure sensor.

In one aspect of the internal combustion engine, the floor surface is inclined so as to be located vertically downward from the second connection port side toward the first connection port in the posture in which the internal combustion engine is mounted.

When the oil mist or water that has entered the chamber collides with the wall surface of the chamber and is separated from gas, the oil mist or water becomes droplets and drips onto the floor surface of the chamber. According to the above configuration, the oil or water that has dripped onto the floor surface flows down toward the first connection port due to its own weight. Therefore, the water or oil generated in the chamber can be discharged from the first connection port.

In one aspect of the internal combustion engine, the joint portion is provided with a third connection port to which the first pipe is connected. The third connection port is located vertically below the first connection port in the posture in which the internal combustion engine is mounted. The first pipe is inclined so as to be located vertically upward from the third connection port side toward the first connection port side in the posture in which the internal combustion engine is mounted.

According to the above configuration, the first pipe has an upward slope from the third connection port toward the first connection port. Therefore, even if oil or water enters the first pipe from the third connection port along the flow of the blow-by gas, the oil or water flows down in the first pipe due to its own weight and easily returns to the joint portion.

Further, when oil or water in the chamber is discharged from the first connection port into the first pipe, the oil or water flows down in the first pipe and is easily discharged to the joint portion. This makes it possible to suppress the oil and water from adhering to the pressure sensor.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of an internal combustion engine will be described with reference to FIGS. 1 to 5.

Configuration of Internal Combustion Engine 90

Figure 1:
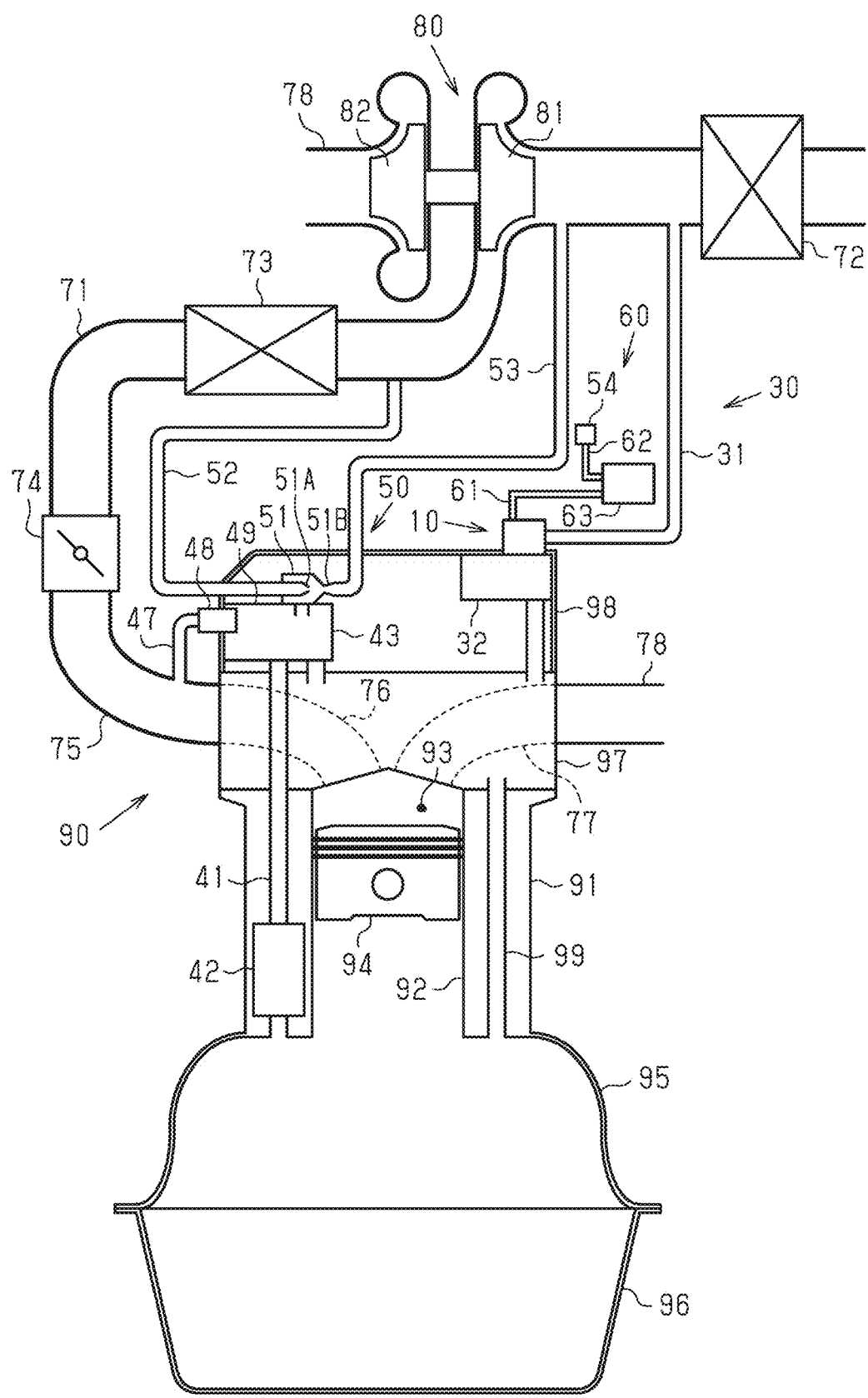
FIG. 1 is a schematic diagram showing an embodiment of an internal combustion engine.

As shown in FIG. 1, the internal combustion engine 90 includes a cylinder block 91, a cylinder head 97, a cylinder head cover 98, a crankcase 95, and an oil pan 96.

A plurality of cylinders 92 is provided in the cylinder block 91. Each cylinder 92 accommodates a piston 94 that reciprocates in conjunction with the rotation of the crankshaft accommodated in the crankcase 95.

An intake valve and an exhaust valve of the internal combustion engine 90 are assembled to the cylinder head 97. The cylinder head cover 98 attached to the cylinder head 97 covers the camshaft that drives the intake valve and the exhaust valve. The cylinder head cover 98 is made of a resin material. A baffle plate is attached to the cylinder head 97 side of the cylinder head cover 98.

The oil pan 96 stores oil used for lubricating each part of the internal combustion engine 90 and the hydraulic drive mechanism.

The internal combustion engine 90 includes a combustion chamber 93 partitioned by the cylinder 92, the piston 94, and the cylinder head 97. The internal combustion engine 90 includes an intake passage 71 for introducing intake air into the combustion chamber 93. The internal combustion engine 90 is provided with an exhaust passage 78 that exhausts the air-fuel mixture combusted in the combustion chamber 93 as exhaust gas.

The internal combustion engine 90 includes a turbocharger 80. A turbine 82 of the turbocharger 80 is disposed in the exhaust passage 78. A compressor 81 connected to the turbine 82 is disposed in the intake passage 71.

An air cleaner 72 is provided in a portion of the intake passage 71 of the internal combustion engine 90 on the upstream side of the compressor 81. An intercooler 73 is provided in a portion of the intake passage 71 on the downstream side of the compressor 81. A throttle valve 74 is provided in a portion of the intake passage 71 on the downstream side of the intercooler 73. Further, an intake manifold 75 is provided in a portion of the intake passage 71 on the downstream side of the throttle valve 74. The intake manifold 75 is connected to the cylinder head 97.

The intake air that has passed through the intake manifold 75 is introduced into the combustion chamber 93 via an intake port 76 provided in the cylinder head 97. The cylinder head 97 is provided with an exhaust port 77 for exhausting exhaust gas from the combustion chamber 93. The exhaust gas discharged from the combustion chamber 93 is discharged to the exhaust passage 78 through the exhaust port 77.

Blow-by Gas Processing Device 30

A blow-by gas processing device 30 included in the internal combustion engine 90 includes a blow-by gas passage 49 that connects the crankcase 95 and the intake passage 71, and causes the blow-by gas that has leaked from the combustion chamber 93 to the crankcase 95 to return to the intake passage 71.

The blow-by gas processing device 30 includes a first separator 43 provided in the blow-by gas passage 49 as an oil separator for separating the oil contained in the blow-by gas. The first separator 43 is provided on the cylinder head cover 98. The first separator 43 is connected to the intake manifold 75 of the intake passage 71 by a blow-by gas discharge pipe 47. As the blow-by gas discharge pipe 47, a rubber hose, a resin pipe, or the like can be used. The blow-by gas discharge pipe 47 is provided with a positive crankcase ventilation (PCV) valve 48 that opens and closes to enable and disable the communication between the first separator 43 and the intake manifold 75. The PCV valve 48 opens when the pressure in the intake manifold 75 is lower than the pressure in the first separator 43 to allow the first separator 43 and the intake manifold 75 to communicate with each other.

The blow-by gas processing device 30 includes a suction passage 41 for introducing the blow-by gas in the crankcase 95 into the first separator 43. The suction passage 41 is provided in the cylinder block 91 and the cylinder head 97. The suction passage 41 is provided with a pre-separator 42 that separates oil from the blow-by gas passing through the suction passage 41.

The blow-by gas processing device 30 includes a connection pipe 31 for introducing fresh air from the intake passage 71 into the crankcase 95. As the connection pipe 31, a rubber hose, a resin pipe, or the like can be used. One end of the connection pipe 31 is connected to a portion of the intake passage 71 between the air cleaner 72 and the compressor 81. The other end of the connection pipe 31 is connected to a second separator 32 serving as an oil separator provided on the cylinder head cover 98. The second separator 32 is partitioned by the cylinder head cover 98 and the baffle plate. The second separator 32 includes a joint portion 10 for connecting the connection pipe 31. A pressure sensor 54 for detecting the pressure in the connection pipe 31 is connected to the joint portion 10 via a connection passage 60.

The connection passage 60 includes a first pipe 61 connected to the joint portion 10, a second pipe 62 connected to the pressure sensor 54, and a chamber 63 to which the first pipe 61 and the second pipe 62 are connected.

The detection signal of the pressure sensor 54 is input to a control device of the internal combustion engine 90. The control device detects the pressure in the connection pipe 31 based on the detection signal of the pressure sensor 54, and detects an abnormality in the connection pipe 31 when the fluctuation of the pressure becomes larger than the specified range.

The cylinder block 91 is provided with a communication passage 99 that communicates with the crankcase 95. The intake passage 71 and the crankcase 95 are connected to each other via the connection pipe 31, the second separator 32, and the communication passage 99. In the following, the passage including the connection pipe 31 and connecting the intake passage 71 and the crankcase 95 may be referred to as a "fresh air introduction passage".

The blow-by gas processing device 30 includes an ejector 50 that generates a negative pressure as the turbocharger 80 is driven. The ejector 50 includes an ejector body 51 connected to the first separator 43. A first intake circulation passage 52 and a second intake circulation passage 53 are connected to the ejector body 51. The first intake circulation passage 52 is connected to a portion of the intake passage 71 between the compressor 81 and the intercooler 73, and the second intake circulation passage 53 is connected to a portion of the intake passage 71 between the air cleaner 72 and the compressor 81. The connection portion between the second intake circulation passage 53 and the intake passage 71 is located on the downstream side of the connection portion between the connection pipe 31 and the intake passage 71. The ejector body 51 includes a nozzle portion 51A that injects intake air supplied through the first intake circulation passage 52 to the second intake circulation passage 53 side. A diffuser portion 51B that gradually expands the air flow path is provided in the ejector body 51 on the second intake circulation passage 53 side with respect to the nozzle portion 51A. The ejector 50 is composed of the ejector body 51, the first intake circulation passage 52, and the second intake circulation passage 53.

When the internal combustion engine 90 is not operated in the turbocharging region and the pressure in the intake manifold 75 is lower than the pressure in the first separator 43, the PCV valve 48 is opened and the blow-by gas in the first separator 43 is introduced into the intake passage 71. At this time, the blow-by gas in the crankcase 95 is drawn into the first separator 43 through the suction passage 41. Further, the intake air is drawn into the crankcase 95 from the intake passage 71 through the fresh air introduction passage.

On the other hand, when the internal combustion engine 90 is operated in the turbocharging region, the intake air that has flowed into the first intake circulation passage 52 from the downstream side of the compressor 81 in the intake passage 71 is returned to the upstream side of the compressor 81 through the ejector body 51 and the second intake circulation passage 53. When the intake air passes through the nozzle portion 51A of the ejector body 51, a negative pressure is generated inside the ejector body 51. At this time, the ejector 50 sucks the blow-by gas in the crankcase 95 via the first separator 43. Then, the ejector 50 discharges the blow-by gas that has passed through the diffuser portion 51B, to the intake passage 71 via the second intake circulation passage 53.

When the internal combustion engine 90 is operated in the turbocharging region, the pressure of the blow-by gas that leaks from the combustion chamber 93 to the crankcase 95 is relatively high. When the pressure in the crankcase 95 is higher than the internal pressure in the portion of the intake passage 71 to which the connection pipe 31 is connected, the blow-by gas in the crankcase 95 flows into the intake passage 71 via the fresh air introduction passage. Even when the internal combustion engine 90 is not operated in the turbocharging region, for example, when the throttle valve 74 is fully open, the blow-by gas that has leaked from the combustion chamber 93 to the crankcase 95 may flow into the intake passage 71 via the fresh air introduction passage.

Connection Passage 60

The connection passage 60 will be described in detail with reference to FIGS. 2 to 5.

Figure 2:
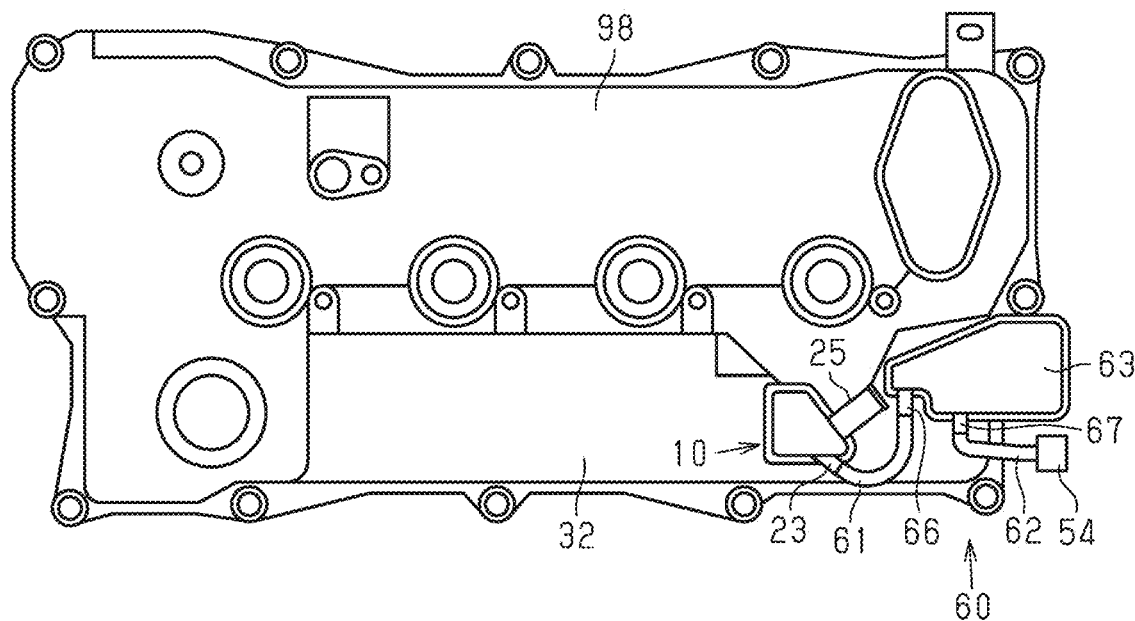
FIG. 2 is a top view of a cylinder head cover of the internal combustion engine according to the same embodiment.
Figure 3:
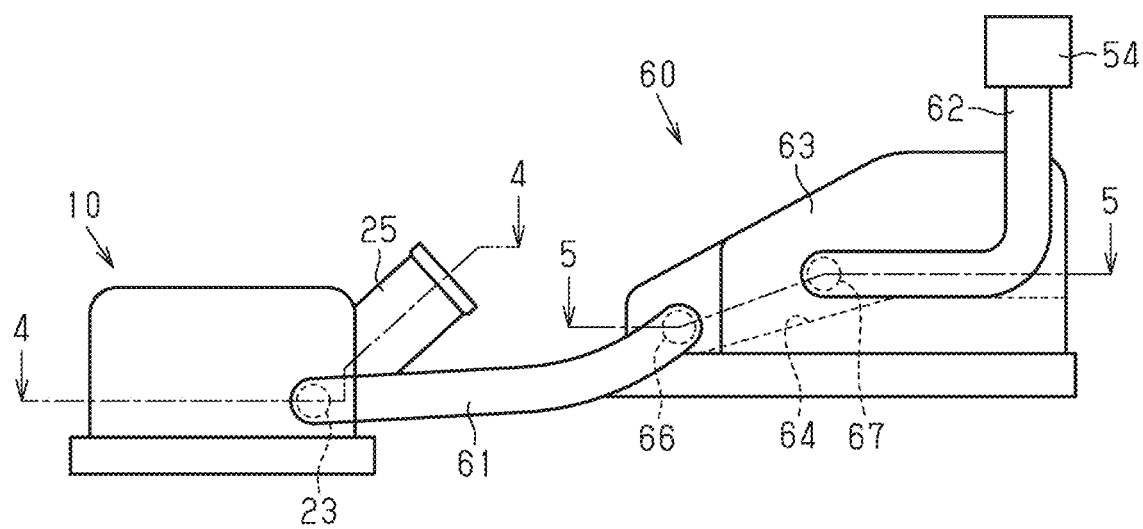
FIG. 3 is a side view of a joint portion and a chamber in the cylinder head cover.
Figure 4:
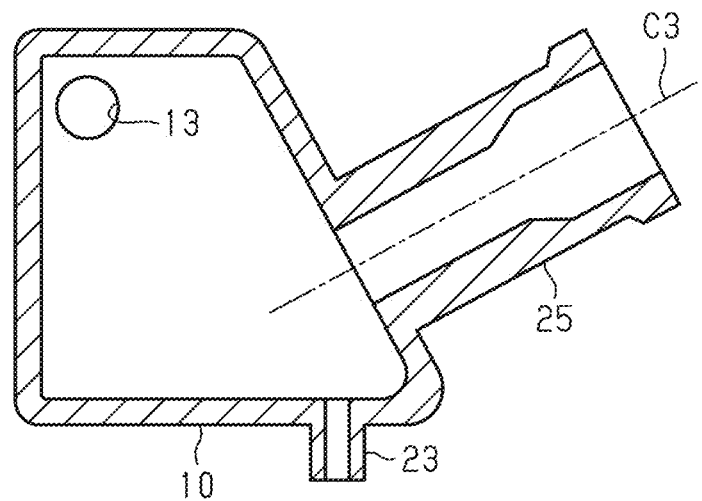
FIG. 4 is a sectional view taken along line 4-4 in FIG. 3.

FIG. 2 shows a top view of the cylinder head cover 98. As shown in FIGS. 2 to 4, the joint portion 10 of the second separator 32 includes a connection port 25. The connection port 25 is inserted into the connection pipe 31 to connect the connection pipe 31 and the joint portion 10.

As shown in FIGS. 2 to 4, the joint portion 10 includes a third connection port 23 to which the first pipe 61 is connected. As shown in FIGS. 2 and 3, the third connection port 23 is inserted into one end of the first pipe 61 to connect the first pipe 61 and the joint portion 10. FIG. 3 is a side view of the joint portion 10 and the chamber 63 in the posture in which the internal combustion engine 90 is mounted on the vehicle. That is, the lower part in FIG. 3 is a vertically lower part in the posture in which the internal combustion engine 90 is mounted.

As shown in FIG. 4, the second separator 32 is provided with a throttle portion 13 on the floor surface of the joint portion 10. The floor surface on which the throttle portion 13 is provided serves as a partition wall, and the second separator 32 is partitioned into a sub chamber composed of the joint portion 10 and a main chamber in the cylinder head cover 98. The passage sectional area of the throttle portion 13, which is a hole penetrating the floor surface that is the partition wall, is narrower than the passage sectional area of the connection port 25. The floor surface of the joint portion 10 is inclined toward the throttle portion 13 with the portion where the throttle portion 13 is provided at the lowermost portion. In FIG. 4, the central axis of the connection port 25 is shown as the third axis C3.

Figure 5:
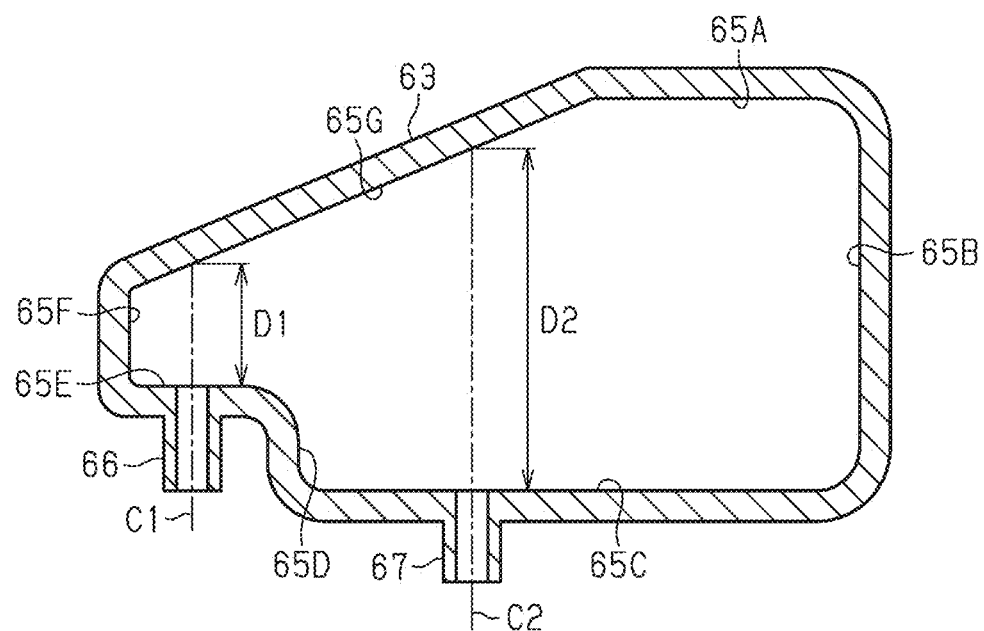
FIG. 5 is a sectional view taken along line 5-5 in FIG. 3.

As shown in FIG. 2, the cylinder head cover 98 is provided with the box-shaped chamber 63. The inside of the chamber 63 is a space surrounded by a ceiling, a floor surface, and a side wall. As shown in FIGS. 2, 3 and 5, the chamber 63 is provided with a cylindrical first connection port 66 and a second connection port 67 communicating with the space inside the chamber 63.

As shown in FIGS. 2 and 3, the first connection port 66 is inserted into the other end of the first pipe 61 to connect the first pipe 61 and the chamber 63. As a result, the space in the joint portion 10 and the space in the chamber 63 are connected via the first pipe 61. As shown in FIG. 3, the third connection port 23 is located vertically below the first connection port 66 in the posture in which the internal combustion engine 90 is mounted on the vehicle. Therefore, the first pipe 61 is inclined so as to be located vertically upward from the third connection port 23 side toward the first connection port 66 side.

The second pipe 62 is connected to the second connection port 67. As shown in FIGS. 2 and 3, the pressure sensor 54 is connected to one end of the second pipe 62. The second connection port 67 is inserted into the other end of the second pipe 62 to connect the second pipe 62 and the chamber 63. As a result, the space in the chamber 63 and the pressure sensor 54 are connected via the second pipe 62. In the internal combustion engine 90, the pressure sensor 54 and the chamber 63 are connected by the second pipe 62, and the chamber 63 and the joint portion 10 are connected by the first pipe 61. That is, the first pipe 61, the chamber 63, and the second pipe 62 constitute the connection passage 60 that connects the pressure sensor 54 and the joint portion 10. As a result, the pressure inside the joint portion 10 can be detected by the pressure sensor 54 connected to the joint portion 10 via the connection passage 60.

As shown in FIG. 3, the pressure sensor 54 is located vertically above the second connection port 67 in the posture in which the internal combustion engine 90 is mounted on the vehicle. The second connection port 67 is located vertically above the first connection port 66 in the posture in which the internal combustion engine 90 is mounted on the vehicle.

As shown by the broken line in FIG. 3, a floor surface 64 in the space inside the chamber 63 is inclined so as to be located vertically downward from the second connection port 67 side toward the first connection port 66 in the posture in which the internal combustion engine 90 is mounted.

As shown in FIG. 5, the side wall of the chamber 63 is divided into seven portions from a side wall 65A to a side wall 65G. A side wall 65B extends at an angle of about 90° with respect to the side wall 65A. A side wall 65F extending substantially parallel to the side wall 65B and facing the side wall 65B is shorter than the side wall 65B. The end of the side wall 65A on the side wall 65F side is connected to the side wall 65G. The side wall 65G is inclined with respect to the side wall 65A and is connected to the side wall 65F. As a result, the upper end portion of the side wall 65B in FIG. 5 is connected to the upper end portion of the side wall 65F in FIG. 5 via the side wall 65A and the side wall 65G.

On the other hand, the lower end portion of the side wall 65B in FIG. 5 is connected to the lower end portion of the side wall 65F in FIG. 5 via a side wall 65C to a side wall 65E. As shown in FIG. 5, the side wall 65C and the side wall 65E extend in parallel with the side wall 65A. The side wall 65C and the side wall 65E are connected by a side wall 65D extending in parallel with the side wall 65B and the side wall 65F. As a result, the side wall 65C, the side wall 65D, and the side wall 65E form a side wall bent in a crank shape. That is, the lower end portion of the side wall 65B in FIG. 5 is connected to the lower end portion of the side wall 65F in FIG. 5 via the side wall bent in a crank shape and composed by the side wall 65C to the side wall 65E.

As shown in FIG. 5, the side wall 65E is located above the side wall 65C in FIG. 5. The first connection port 66 is provided on the side wall 65E. In FIG. 5, the central axis of the first connection port 66 is shown as the first axis C1. The second connection port 67 is provided on the side wall 65C. That is, the first connection port 66 and the second connection port 67 are provided on the side wall of the chamber 63.

In FIG. 5, the central axis of the second connection port 67 is shown as the second axis C2. The first connection port 66 and the second connection port 67 are open toward the same direction in the chamber 63. Specifically, the first axis C1 and the second axis C2 are parallel to each other and both intersect the side wall 65G. That is, both the first connection port 66 and the second connection port 67 are open toward the side wall 65G. The side wall 65G is inclined, and the side wall 65E is located above the side wall 65C in FIG. 5. Therefore, the distance D1 between the first connection port 66 and the side wall 65G is shorter than the distance D2 between the second connection port 67 and the side wall 65G.

Operation of Present Embodiment

The internal combustion engine 90 includes the joint portion 10 to which the pressure sensor 54 is connected and in which the third connection port 23 is provided further on the connection port 25 side than the throttle portion 13. Therefore, when the connection pipe 31 is disconnected or damaged, the portion provided with the third connection port 23 is opened to the atmosphere, and the detected value of the pressure sensor 54 tends to fluctuate so as to approach the atmospheric pressure. That is, when an abnormality occurs in the connection pipe 31, the abnormality can be detected by the fluctuation of the detection value of the pressure sensor 54.

Intake pulsation occurs during the operation of the internal combustion engine 90. The pressure sensor 54 is connected to the joint portion 10 via the first pipe 61, the chamber 63, and the second pipe 62. Therefore, even when the intake pulsation propagates to the joint portion 10, the intake pulsation is mitigated when passing through the chamber 63. Further, the first connection port 66 and the second connection port 67 are open toward the same direction in the chamber 63. Therefore, the intake pulsation propagated into the chamber 63 through the first pipe 61 first propagates in the direction away from the second connection port 67. Therefore, it is difficult for the intake pulsation to propagate to the second connection port 67.

Further, the pressure wave that has propagated into the chamber 63 through the first connection port 66 tends to be attenuated when colliding with the side wall of the chamber 63. According to the configuration of the above embodiment, by causing the pressure wave that has propagated through the first connection port 66 to collide with the side wall 65G to attenuate the pressure wave, the influence of the intake pulsation on the pressure value detected by the pressure sensor 54 can be mitigated.

Effect of Present Embodiment (1) Since the chamber 63 having a wide space is provided partway through the connection passage 60, the intake pulsation that has propagated into the chamber 63 through the first pipe 61 is less likely to propagate to the second connection port 67. Therefore, it is possible to suppress fluctuations in the pressure value detected by the pressure sensor 54 from occurring due to the influence of the intake pulsation. As a result, by monitoring the pressure value detected by the pressure sensor 54, it is possible to appropriately detect an abnormality in the connection pipe 31.

(2) Since the first connection port 66 and the second connection port 67 are open toward the same direction in the chamber 63, the intake pulsation that has propagated into the chamber 63 through the first pipe 61 is less likely to propagate to the second connection port 67.

(3) By causing the pressure wave that has propagated through the first connection port 66 to collide with the side wall 65G to attenuate the pressure wave, the influence of the intake pulsation on the pressure value detected by the pressure sensor 54 can be mitigated.

(4) The shorter the distance between the first connection port 66 and the side wall facing the first connection port 66, the more likely the pressure wave is attenuated by colliding with the side wall. However, if the second connection port 67 is also located near the side wall, the pressure wave that has collided with the side wall and bounced off is likely to enter the second connection port 67.

In this view, as in the above configuration, when the first connection port 66 is near the side wall 65G facing the first connection port 66, but the second connection port 67 is distanced from the side wall 65G, the influence of the pressure wave bouncing off from the side wall 65G can be suppressed. Therefore, the pressure wave that has propagated from the first connection port 66 into the chamber 63 can be caused to collide with the side wall 65G to effectively mitigate the influence of the intake pulsation.

(5) The blow-by gas contains oil mist and water. If oil or water derived from such oil mist or water adheres to the pressure sensor 54, the detection sensitivity of the pressure sensor 54 will decrease. According to the configuration of the above embodiment, the second connection port 67 is located vertically above the first connection port 66. Therefore, even if oil or water enters the chamber 63 through the first connection port 66 along the flow of the blow-by gas, the oil or water is unlikely to reach the second connection port 67. It is thus possible to suppress oil and water from adhering to the pressure sensor 54.

(6) When the oil mist or water that has entered the chamber 63 collides with the wall surface of the chamber 63 and is separated from gas, the oil mist or water becomes droplets and drips onto the floor surface 64 of the chamber 63. According to the configuration of the above embodiment, since the floor surface 64 is inclined toward the first connection port 66, the oil or water that has dripped onto the floor surface 64 flows down toward the first connection port 66 due to its own weight. Therefore, the water or oil generated in the chamber 63 can be discharged from the first connection port 66.

(7) In the configuration of the above embodiment, the first pipe 61 is inclined so as to be located vertically upward from the third connection port 23 side toward the first connection port 66 side. That is, the first pipe 61 has an upward slope from the third connection port 23 toward the first connection port 66. Therefore, even if oil or water enters the first pipe 61 from the third connection port 23 along the flow of the blow-by gas, the oil or water flows down in the first pipe 61 due to its own weight and easily returns to the joint portion 10.

(8) Further, when oil or water in the chamber 63 is discharged from the first connection port 66 into the first pipe 61, the oil or water flows down in the first pipe 61 and is easily discharged to the joint portion 10. This makes it possible to suppress the oil and water from adhering to the pressure sensor 54.

Modifications

The present embodiment can be modified and implemented as follows. The present embodiment and modification examples described below may be carried out in combination of each other within a technically consistent range.

The configuration in which the pressure sensor 54 is connected to the joint portion 10 via the connection passage 60 in the above embodiment can also be applied to other pipes connecting the cylinder head cover 98 and the intake passage 71. For example, the configuration can be applied to the blow-by gas passage 49. Specifically, the same configuration as that of the above embodiment can be applied to the joint portion for attaching the blow-by gas discharge pipe 47 to the first separator 43. In this case, the pressure sensor 54 detects an abnormality in the blow-by gas discharge pipe 47.

In the above embodiment, an example in which the floor surface of the joint portion 10 is inclined toward the throttle portion 13 is shown, but the floor surface does not need to be inclined.

In the above embodiment, an example in which the floor surface 64 of the chamber 63 is inclined is shown, but the floor surface 64 does not need to be inclined.

Although an example in which the third connection port 23 is located vertically below the first connection port 66 is shown, such a positional relationship does not necessarily need to be adopted. For example, the third connection port 23 and the first connection port 66 may be arranged horizontally.

Although an example in which the second connection port 67 is located vertically above the first connection port 66 is shown, such a positional relationship does not necessarily need to be adopted. For example, the second connection port 67 and the first connection port 66 may be arranged horizontally. Further, the second connection port 67 may be located vertically below the first connection port 66.

An example in which the distance D1 between the first connection port 66 and the side wall 65G is shorter than the distance D2 between the second connection port 67 and the side wall 65G is shown. However, the relationship in terms of the magnitude of the distance from each connection port to the side wall does not necessarily need to be such a relationship.

An example in which the first connection port 66 and the second connection port 67 are open toward the side wall 65G is shown. That is, an example in which the first connection port 66 and the second connection port 67 are open toward a common side wall is shown. However, the side wall facing the opening of the first connection port 66 and the side wall facing the opening of the second connection port 67 may be different. It is only necessary that at least the first connection port 66 and the second connection port 67 face the same direction in the chamber 63.

The internal combustion engine 90 in the above embodiment includes the turbocharger 80, but the turbocharger 80 is not an essential configuration. Even in the internal combustion engine 90 that does not include the turbocharger 80, the abnormality of the connection pipe 31 can be detected by the pressure sensor 54 as in the above embodiment. Even in the internal combustion engine 90 that does not include the turbocharger 80, when the throttle valve 74 is fully open, the blow-by gas that has leaked from the combustion chamber 93 to the crankcase 95 may flow into the intake passage 71 via the fresh air introduction passage.

The internal combustion engine 90 in the above embodiment is configured to generate a negative pressure by the ejector 50 and discharge the blow-by gas to the intake passage 71 when the internal combustion engine 90 is operated in the turbocharging region. However, the ejector 50 can be omitted. In this case, when the internal combustion engine 90 is operated in the turbocharging region, the blow-by gas can be discharged to the intake passage 71 through the fresh air introduction passage.

What is claimed is:

1. An internal combustion engine including a blow-by gas processing device that processes blow-by gas that has leaked from a combustion chamber to a crankcase, by causing the blow-by gas to return to an intake passage, wherein:
    a cylinder head cover is provided with a joint portion including a connection port to which a connection pipe is connected and a throttle portion having a passage sectional area smaller than a passage sectional area of the connection port;
    the joint portion is communicated with an inside of a cylinder head via the throttle portion, and a space between the throttle portion and the connection port of the joint portion serves as an oil separator that separates oil contained in the blow-by gas;
    the internal combustion engine includes a pressure sensor that is connected to the space in the oil separator at the joint portion via a connection passage and that detects pressure in the oil separator;
    the connection passage includes a first pipe connected to the joint portion, a second pipe connected to the pressure sensor, and a chamber including a first connection port to which the first pipe is connected and a second connection port to which the second pipe is connected; and
    the first connection port and the second connection port are open toward the same direction in the chamber.

2. The internal combustion engine according to claim 1, wherein:
    an inside of the chamber is a space surrounded by a ceiling, a floor surface, and a side wall;
    each of the first connection port and the second connection port is provided on the side wall; and
    the first connection port and the second connection port are open toward the side facing the side wall provided with the first connection port and the second connection port in the chamber.

3. The internal combustion engine according to claim 2, wherein:
    the first connection port and the second connection port are open toward a common side wall in the chamber; and
    a distance between the first connection port and the common side wall is shorter than a distance between the second connection port and the common side wall.

4. The internal combustion engine according to claim 2, wherein the second connection port is located vertically above the first connection port in a posture in which the internal combustion engine is mounted.

5. The internal combustion engine according to claim 2, wherein the floor surface is inclined so as to be located vertically downward from the second connection port side toward the first connection port in a posture in which the internal combustion engine is mounted.

6. The internal combustion engine according to claim 1, wherein:
    the joint portion is provided with a third connection port to which the first pipe is connected;
    the third connection port is located vertically below the first connection port in the posture in which the internal combustion engine is mounted; and
    the first pipe is inclined so as to be located vertically upward from the third connection port side toward the first connection port side in the posture in which the internal combustion engine is mounted.

* * * * *